Sept. 7, 1943. J. N. KENYON 2,328,908
FATIGUE TESTING MACHINE AND METHOD
Filed June 23, 1941 4 Sheets-Sheet 1
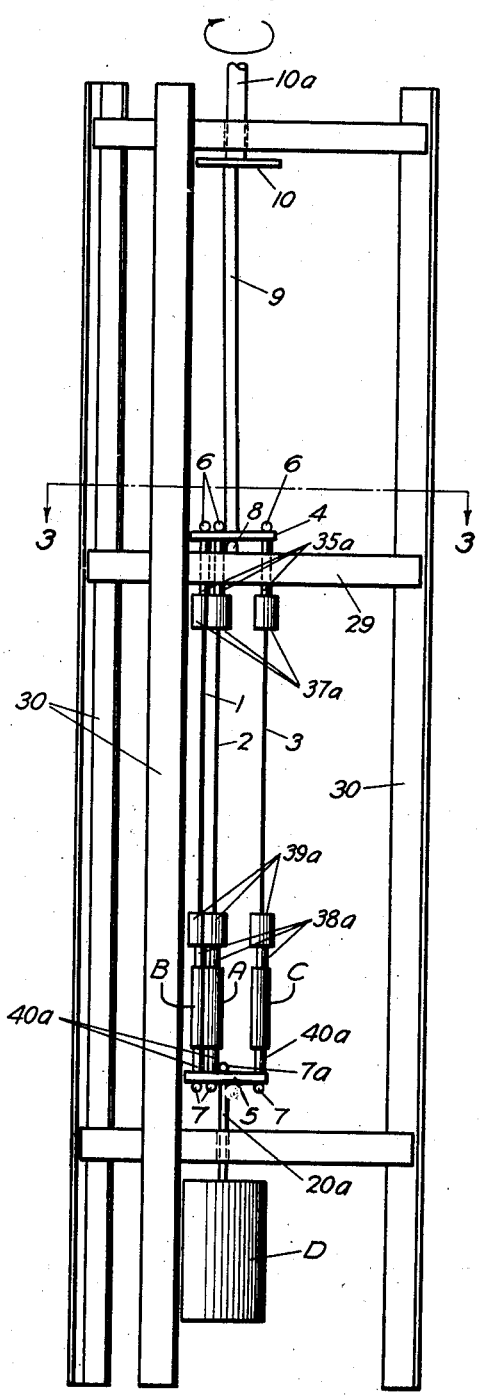
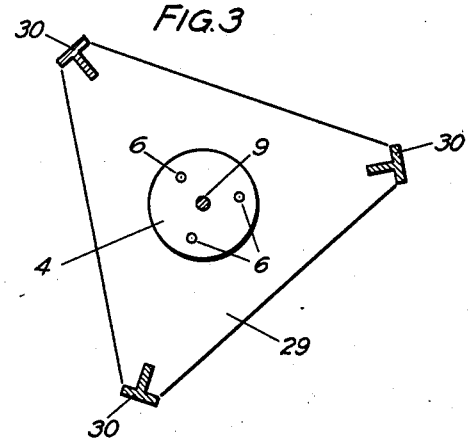
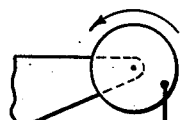
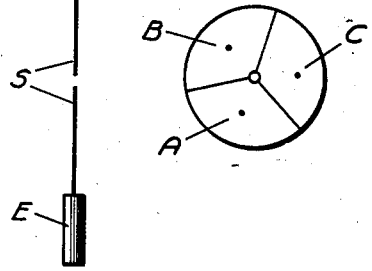
INVENTOR
JOHN N. KENYON
BY
ATTORNEY Sept. 7, 1943.  J. N. KENYON  2,328,908
FATIGUE TESTING MACHINE AND METHOD
Filed June 23, 1941  4 Sheets-Sheet 2
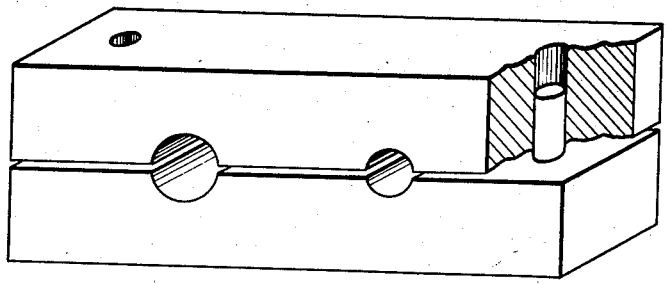
FIG. 11
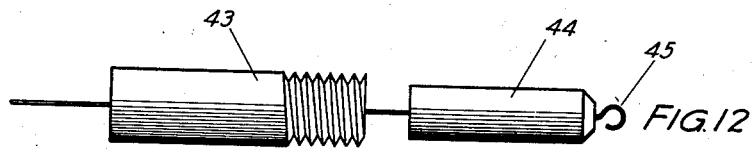
FIG. 12
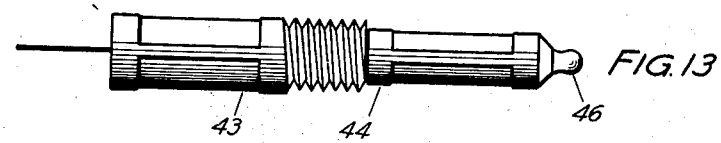
FIG. 13
FIG. 5
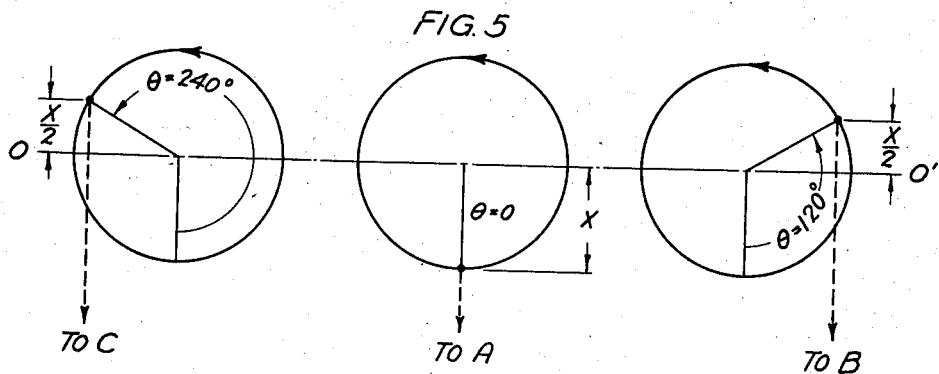
INVENTOR
JOHN N. KENYON
BY
ATTORNEY Sept. 7, 1943.                J. N. KENYON                2,328,908
              FATIGUE TESTING MACHINE AND METHOD
                  Filed June 23, 1941        4 Sheets-Sheet 3
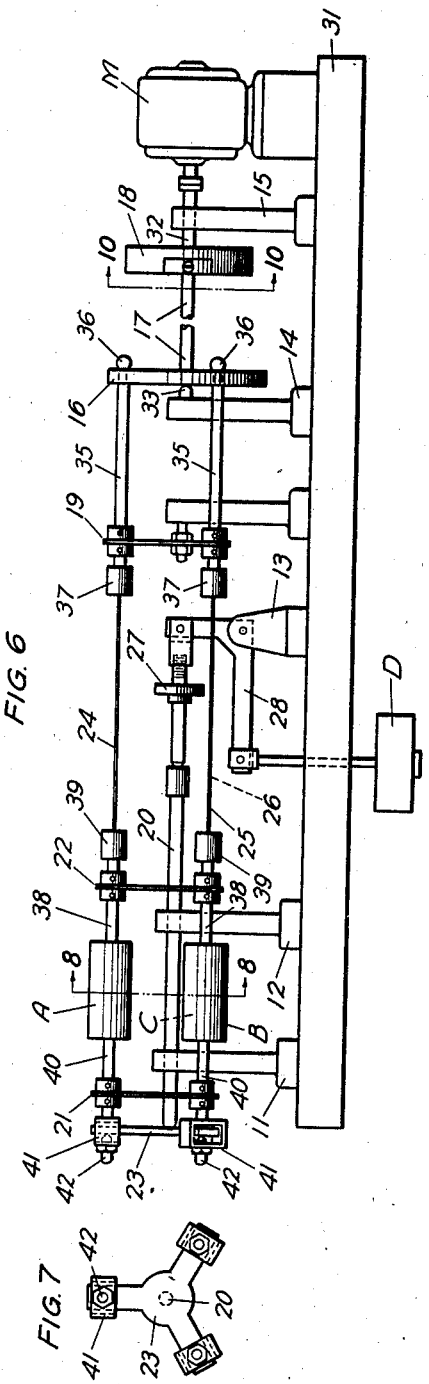
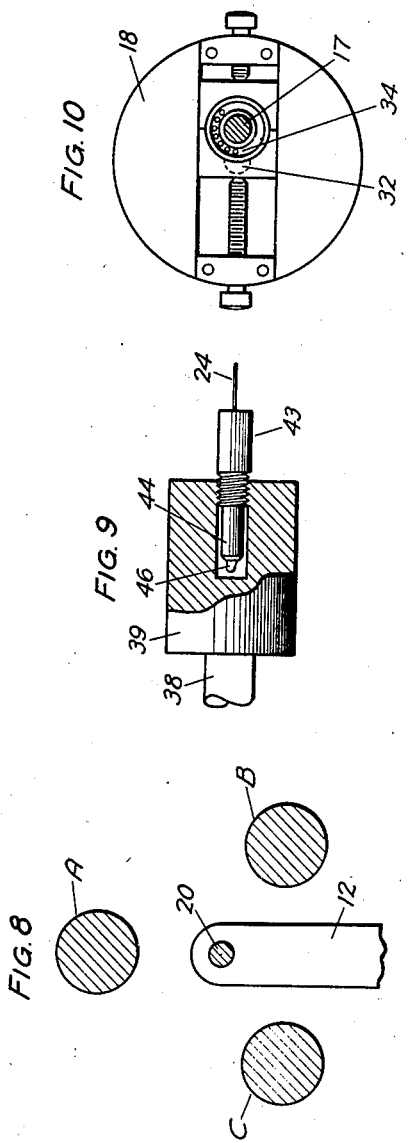
INVENTOR
JOHN N. KENYON
BY
ATTORNEY Patented Sept. 7, 1943

2,328,908

UNITED STATES PATENT OFFICE 2,328,908

FATIGUE TESTING MACHINE AND METHOD

John N. Kenyon, New York, N. Y.

Application June 23, 1941, Serial No. 399,320

21 Claims. (Cl. 73—51)

The present invention relates to fatigue testing machines and, more particularly to a pulsating tension fatigue machine for testing wires having small diameters.

It is well known that much valuable information may be secured from physical tests determining various properties of wires, such as the tensile strength. However, it has been shown that there is little, if any, relationship between the fatigue limit or endurance properties of a wire and its other physical properties. In view of this fact and in view of the direct relation of fabricated wire products to the problem of public safety, it is essential that accurate test methods be devised for determining the endurance properties of such materials.

At one time it was believed that metals actually did "fatigue" or tire out, but this conception has long since been discredited. Today fatigue failure is more properly defined as the phenomenon of the "spreading crack" under the action of variable loading. It is commonly accepted that fatigue cracks have their origin at some minute imperfection in the metal, some crystal plane or boundary, and that the crack, once started, is propagated under the action of pulsating or cyclic stress. Intensive investigations have shown that the fatigue limit of metals is to a large extent affected by the condition of the surface. Imperfections, scratches, and surface decarburation frequently reduce the fatigue limit of wire more than 50 per cent.

Fatigue cracks are practically confined to the elastic range of metals, since the fractures show no indication of plastic flow. The breaks are straight across, and the fractured surfaces are "glassy" in appearance, markedly resembling the fractured end of a glass rod. The propagation of a fatigue crack, once started, is relatively simple. Under the action of pulsating stress, the crack rapidly expands and widens, and gets deeper and deeper until there is eventual rupture of the metal. Final fracture occurs suddenly after the cross-sectional area has been considerably reduced by the spreading crack.

Plotted fatigue data are termed "S—N curves"; the stress, S, is plotted against the number of stress pulsations, N, and usually on the semilogarithmic scale. The stress at which the fatigue curve trends toward the horizontal, or becomes asymptotic, is taken as the fatigue or endurance limit of the material.

For a proper evaluation of the endurance properties of wire products, there must be considerable similarity between conditions existing during the testing of the product and the conditions under which the commercial product is to be employed. Wire in service is subjected to cycles of repeated stress. Common causes of such cycles include pulsating tensional loads on the wire, cyclical flexural or vibrational loads, and repeated flexure. These, in general, may be classified as pulsating tensional stresses, so that the wire products under such conditions are subjected to a steady tensile load in addition to a pulsating tensional stress.

Prior to 1930, no practical method was available whereby fatigue tests on wire could be carried out. This lag in development was due in part to mechanical difficulties and partly to the belief that necessary information could be obtained from a specimen that was machined from the wire bar. It then came to be realized that wire, being a finished fabricated product with surface imperfections, should be tested in the finished, processed condition. The mechanical difficulties contingent on the fatigue testing of wire were the small cross-sectional area and the curve in any length of wire due to coiling. Wire had to be straightened for stress-reversal tests, and proper straightening was somewhat difficult and always involved the possibility of changing the physical properties of the wire.

After 1930, serious consideration was given to the mechanical problems involved in the testing of wire. Several types of fatigue machines were developed and were based primarily upon the principle of stress reversal. In other words, the wire test specimen was bent to some curved form and rotated, and the outer fibres were subjected to alternate tension and compression. Bending a wire into some curved form places the convex side under tensional stress and the concave side under compressional stress, and thereafter rotating the wire through 180° places under compression the side formerly in tension and vice versa. Continuing the rotation the full 360° places the two sides back under their original stresses.

Various machines were proposed for fatigue testing but none of these machines gave truly accurate results. Some machines had the shortcoming of tending to give high results in that fatigue breaks were confined to the center portion of the test specimen, regardless of imperfections existing elsewhere. Although other machines did subject a much greater length of wire to the fatigue test, these machines had the disadvantage of giving low results because of the frictional effect produced by a grooved circular guide which tended to score the test specimen and to lower the apparent value of the fatigue limit. Recognizing the critical need for both uniform circular curvature and absence of frictional contact in order to have the wire break at the weakest point and to give truly representative fatigue values, I applied myself to this problem and succeeded in discovering a machine embodying a new principle. This culminated in the issuance to me of U. S. Patent No. 2,170,640 for "Fatigue testing machine." The machine therein disclosed was so adapted to hold a test wire in curved form that the curvature which the rotating wire automatically assumed was necessarily that of "simple bending," that is, the arc of a circle. In that machine a constant radius of curvature was obtained which gave uniform flexural stress without any contact with a friction-producing solid surface. Uniform stress was achieved for the whole specimen and hence a test was obtained at every point on the full arcuate length, leading to failure at the weakest point of the wire and hence to far more accurate and reliable results.

However, a serious problem arose for which my rotating-wire arc fatigue machine did not provide an altogether satisfactory solution. An extensive investigation of steel bead wire (for automobile tire reinforcement) was undertaken, primarily to determine whether loss in endurance properties with service contributed to highway accidents. Bead wires are subjected to cyclical stresses of a comparatively high order and to widely varying conditions of environment. The function of bead wire is to keep the tire, in which it is incorporated, upon the rim of an automobile wheel by resisting the forces set up by inflation and by centrifugal force. Inflational pressure exerts a steady tensional stress on the wire, while centrifugal force, a function of varying speed, exerts a pulsating tensional stress, and introduces the problem of fatigue. The wire also resists certain forces of vibrational and flexural nature due to uneven road beds and the rounding of curves; these, in general, as pointed out supra, may be classified as pulsating tension stresses.

If the rate of deterioration of bead wire materials in tires could be determined, some evaluation might be made of the safe length of time that a tire should be in service. Obviously the rate of deterioration of bead wire can be determined by endurance tests made on materials that have been in service various periods of time. However, when an investigation along these lines was begun, it was discovered that no suitable test method was available for the performance of these tests. Wire fatigue machines of the prior art required straight test specimens, whereas the wire taken from the tire construction was curved. However, the only fatigue test method applicable to a curved wire was pulsating-tension, and no satisfactory test method had ever been developed for small diameter wire. Machines designed for this type of testing, such as the Haigh alternating-stress machines, were not adaptable to the application of a load under 500 pounds. This lag in development was attributable to mechanical difficulties, since "pulsating tension" was an unbalanced force system, involving critical inertial effects, and was also attributable to the difficulty of gripping the test specimens. On the other hand, it appeared to me that the pulsating tension test offered basic possibilities for investigating wire materials and was far superior in principle to the stress-reversal method. It had the advantage, if it could be adapted to wires, of subjecting the entire cross-section of a specimen to the desired maximum stress, and this seemed a more effective method for integrating the combined effects of surface imperfections and crystalline inhomogeneity. Thus, the pulsating tension test offered a possible solution to the complex bead wire problem, but none of the many attempts made by the prior art had, so far as I am aware, been in any measure successful in applying pulsating tension fatigue tests to small diameter wires.

I have discovered that the above mentioned difficulties and others in conventional methods of fatigue testing small diameter metal objects, including wire, may be overcome in a relatively simple and wholly satisfactory way.

It is an object of the present invention to provide an apparatus for fatigue-testing small diameter metallic objects by means of pulsating tension stresses thereon, whereby a specimen is kept in tension while varying between limits the tensile load to which it is subjected.

It is another object of my invention to provide an apparatus for fatigue testing small diameter metallic wires wherein the entire cross-section of a wire can be subjected to a desired maximum stress, thereby providing a most effective method for integrating the combined effects of surface imperfections and crystalline inhomogeneity.

Another object of my invention is to provide a method for fatigue-testing filamentary articles, such as automobile tire bead wires wherein conditions similar to those to which such wires would be subjected under actual use can be approximated.

The present invention likewise contemplates the provision of an apparatus for the pulsating tension fatigue testing of small diameter wires wherein breaks do not occur at the grips which hold the wires.

It is also within the contemplation of my invention to provide a method of determining the approximate safe length of time of service of small diameter wires by subjecting specimens of varying service records to comparative pulsating tension fatigue tests.

My invention further provides a fatigue-testing machine adaptable to the testing of curved small diameter wires which combines simplicity of construction, ease of operation and accuracy of determination.

Other objects and advantages of the present invention will become apparent to those skilled in the art from the following description taken in conjunction with the drawings, in which:

Fig. 1 is a schematic representation of a simplified apparatus for subjecting a wire to pulsating tensional stresses;

Fig. 2 is a front elevational view of an apparatus embodying the principles of the present invention;

Fig. 3 is a sectional view taken through the line 3—3 of Fig. 2;

Fig. 4 is a plan view of a simplified mass system wherein the masses A, B and C of Fig. 2 are combined into one mass;

Fig. 5 illustrates diagrammatic representations of three reciprocating movements constituting a balanced dynamc force system such as achieved in the present invention;

Fig. 6 is a front elevational view of a horizontal modification of an apparatus embodying the principles of the present invention;

Fig. 7 is an end view of the spider 23 of Fig. 6;

Fig. 8 is a sectional view taken through the line 8—8 of Fig. 6;

Fig. 9 is a view partly in section showing a satisfactory form of specimen holder for use in the present invention;

Fig. 10 is a sectional view through the line 10—10 of Fig. 6 showing a satisfactory means for controlling and varying the pulsating load exerted on a test specimen in the present invention;

Fig. 11 is a front elevational view of a die satisfactorily used in carrying out a method of gripping test specimens;

Fig. 12 shows the sleeves used in a satisfactory method of gripping test specimens loosely fitted over a test wire before crimping;

Fig. 13 shows the sleeves after being tightly crimped onto the test wire and ready for being gripped and tested in accordance with the present invention.

Figure 14:
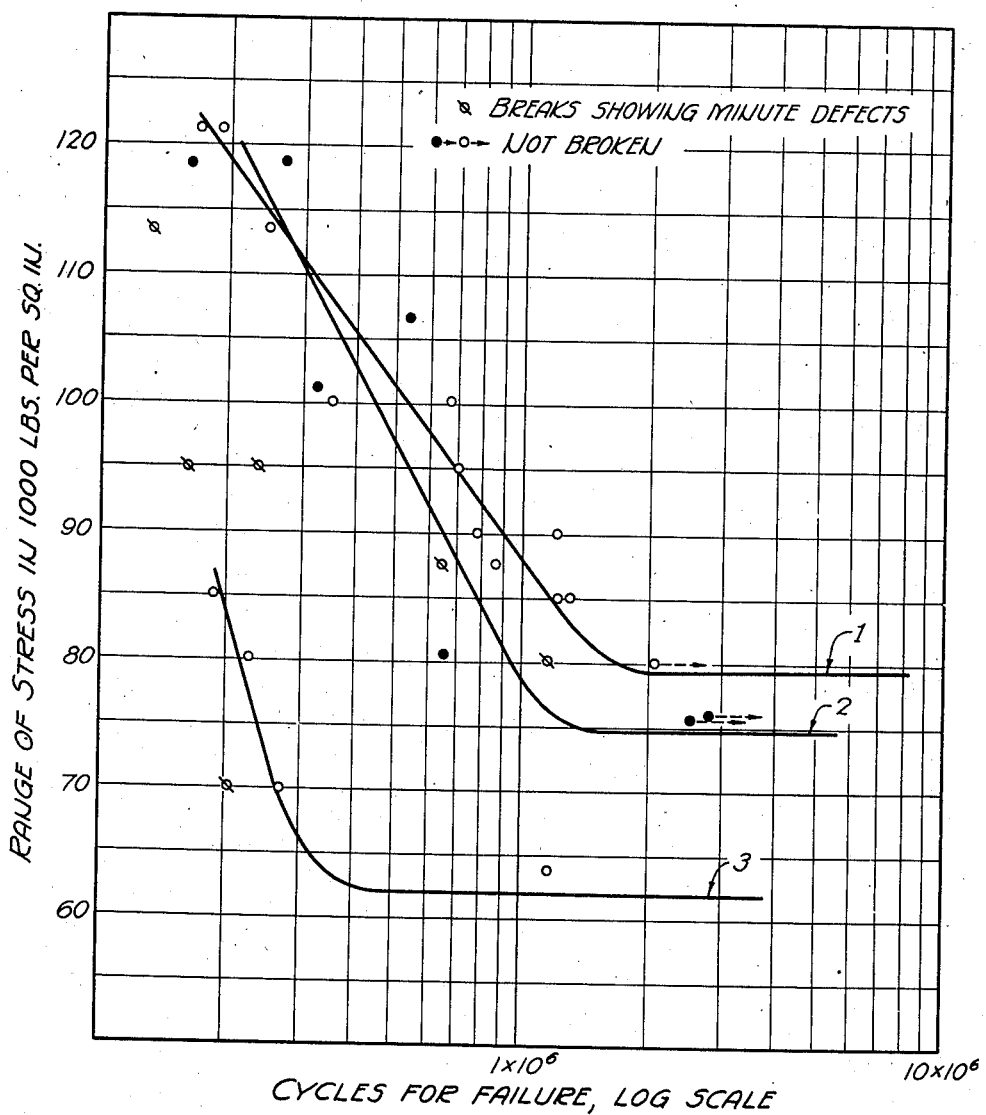
Fig. 14 is a graph showing plotted data obtained by fatigue tests carried out in accordance with the present invention.

Fatigue data obtained by pulsating tension methods involve more difficulties than those encountered in any one of the stress reversal methods. The entire cross-section of the wire, not just the outer fibres, is subjected to the desired cyclical stress. This necessitates a powerful reciprocating mechanism and requires the technique of dealing with all the accompanying inertial effects. For example, a wire 0.037 inch in diameter, bent to a curve and rotated between the fingers, can easily be stressed in the outer fibres to more than 100,000 pounds per square inch, whereas, in order to exert the same stress by pulsating longitudinally, it requires straight pulls of more than 100 pounds.

The present invention relates to a new fatigue-testing machine, particularly a new pulsating-tension fatigue-testing machine, and to a new method of fatigue testing. The invention employs a constant tensional force and a plurality of reciprocating or oscillating masses, preferably three, actuated by means of a motor or the like and pulsating out of phase by a constant difference thereby providing a substantially balanced force system wherein the reciprocating forces exert a constant torque effect and simplifying the calibration with respect to a test wire which is subjected to the pulsating stress of only one of the three reciprocating forces.

Broadly stated, the present invention provides an apparatus for fatigue testing or for testing the fatigue endurance of objects, for example filamentary objects, particularly wires, comprising means operatively connecting a mass to the object undergoing test, means for imposing a substantially steady stress on said object, and means for regularly and periodically imparting positive and negative acceleration to said object and mass.

More preferably, the apparatus provided by the present invention comprises means operatively connecting a mass to each of a plurality of wires, means for practically harmonically reciprocating said wires and operatively connected masses in out of phase relation such that the resultant of the stresses in the wires produced by the acceleration of said masses is substantially zero, and means for imposing a substantially steady equal tensile stress on each of said wires greater than the maximum stress produced in each of said wires by the acceleration of the operatively connected mass during operation of the apparatus.

In practice, the apparatus may comprise two levers; means for operatively mounting a plurality of objects, for example, elongated or filamentary objects, particularly wires, in balanced relation between said levers; at least one mass operatively connected to each of said objects, preferably with the center of mass in axial alignment with the elongated or filamentary objects; means for applying a force on the fulcrums of said levers; and means for moving one of said levers about its fulcrum, usually in practically simple harmonic motion. The objects are mounted between said levers, from positions thereon so located at the extremities of radii of a circle concentric with the fulcrum of the lever that said radii form equal central angles or subtend equal arcs or chords between successive positions of mounting. While the invention is described in terms of levers, it will be apparent that in actual practice these levers may take the form of a disk, spider or other shape supported on a fulcrum, bearing, pivot or other point of motion, oscillation, etc., but essentially all such variations are levers with two, three or even more arms and it is to be understood that when I refer to a lever I include within the term such obvious forms of levers as disks, spiders and others apparent to those skilled in the art. It is likewise to be understood that while I refer to simple harmonic motion and to harmonically reciprocating a mass, in actual practice many forms of regular periodic motion are available which approximate simple harmonic motion and it is intended to include any regular periodic motion wherein a mass is accelerated positively and negatively.

The pulsating tension test method of the present invention is essentially a method wherein a wire or other filamentary object is subjected to some mean force, W, and this force rapidly varied from $W-w$ to $W+w$; the range of force is governed by the magnitude of $2w$. In testing wires mean load W is of sufficient magnitude to retain a tension load on the wire at all times so that it will not buckle. Broadly stated, the method of the present invention comprises operatively connecting a mass to the object undergoing test, imposing on said object a substantially steady stress, and subjecting said object and mass to regular periodic positive and negative acceleration. In practice, the method of the present invention more preferably comprises operatively connecting a mass to each of a plurality of wires, imposing on said wires a tensile stress, reciprocating said wires and masses practically harmonically in out of phase relation such that the resultant of the stresses produced by the acceleration of said masses is substantially zero. In testing wires under pulsating-tension, the tensile stress imposed on each wire should be greater than the maximum stress produced in the wire by the acceleration of the operatively connected mass.

Assume a crank and weight assembly, such as depicted in Fig. 1, wherein a body, E, suspended by a long wire, S, is accelerated upward and downward. This body E moves with practically simple harmonic motion and subjects the wire to a pulsational tension force. If the crank is turned too fast, this wire will buckle when the accelerations of the crank exceeds that of gravity and it follows that the wire then will no longer be under tension. Due to its limitation to low speeds in order to avoid buckling, such a simple system is not practical for the fatigue testing of wires and the like. If, for instance, the downward travel of the crank is faster than the free fall of the weight, the wire will buckle and jerk the weight on the return upward stroke of the crank thereby superimposing unpredictable stresses on the wire tending to fracture it prematurely and as a result reproducible and accurate data will be unattainable.

Assume now that there are three bodies, A, B and C, and that they are suspended by wires 1, 2 and 3, 120 degrees apart, near the edge of a horizontal disk 4, essentially a lever with three lever arms movable about a central fulcrum. Such an assembly is shown in Figs. 2 and 3 which depict one embodiment of the present invention. From these three bodies, by means of a spider arrangement 5 acting as another lever with three lever arms, is suspended a fourth weight D. When the disk 4 is oscillated, by rotating the driving mechanism (not shown), any point in the perimeter of the disk travels in a small vertical circle. The three weights are thus accelerated vertically in simple harmonic motion; should the accelerations exceed that of gravity, the wires will not buckle since they are held taut by the constant stationary load D.

Referring to Figs. 2 and 3, identical weights A, B and C are suspended by wires 1, 2 and 3, 120 degrees apart, near the edge of horizontal disk 4 and equidistant from the center or point of support. From these weights is suspended a fourth weight D at the central axis of the force system parallel to the wires. The weights A, B and C are suspended from disk 4 by three connecting arms 35a fitted with ball bearing ends 6 seated in three depressions in disk 4 with holes or bores extending through the disk from the bottom of each depression through which these connecting arms extend vertically downwards. Connecting arms 35a are provided with gripping means 37a such as described hereinafter and illustrated in Figs. 9 and 13. Wires 1, 2 and 3 are suspended from these gripping means and weights A, B and C are suspended from the wires by similar gripping means 39a and connecting arms 38a. Connecting arms 35a are not rigidly fixed to the disk 4 but are free to maintain themselves in a vertical position when the horizontal disk 4 is oscillated. In Fig. 2 means for accomplishing this result has been shown by providing in the disk 4 a bore of larger diameter than the connecting arms but so dimensioned that the bearing 6 will seat against the disk 4. A similar arrangement is provided for spider 5 with ball thrust bearings 7 seating against the lower surface of spider 5 and being connected to the weights A, B and C through connecting arms 40a. From spider 5 a stationary weight D is suspended by a connecting arm 20a fitted with a ball bearing 7a bearing against a recess seat in the upper surface. The spider 5 is thus free to oscillate about the bearing 7a, acting as the fulcrum of a lever, without imparting motion to the constant weight D. Disk 4, supported by thrust bearing 8, is provided with an arm 9, rigidly fixed to the disk 4. The thrust bearing 8, acting as the fulcrum of the lever in the form of disk 4, is supported by horizontal member 29 which in turn is rigidly fixed to and supported by uprights 30. Arm 9 operatively and eccentrically engages a flywheel 10, usually through an adjustable eccentric ball race (not shown) in the flywheel. Arm 9 non-rigidly engages flywheel 10 so that when flywheel 10 is rotated the engaging end of arm 9 is displaced through a circular path, i. e., the engaging end of arm 9 revolves but does not rotate about a vertical axis through the center of flywheel 10. Flywheel 10 is actuated by any suitable means (not shown) such as through a rigidly connected rotatable shaft 10a.

In operation, when flywheel 10 is rotated the upper end of arm 9 is displaced through a vertical circular path thus oscillating disk 4 which is rigidly fixed to arm 9. The three weights A, B and C are thus accelerated vertically in substantially simple harmonic motion and each exerts a pulsating stress on the wire supporting the weight. In testing wires and other filamentary articles under pulsating-tension, freely suspended weight D, which is applied substantially in the central axis of the force system and is not accelerated, must be of such magnitude that the portion of the load supported by each wire is sufficient to maintain each wire in tension. Thus, if due to the positive and negative acceleration of weight A there is exerted on the wire a load varying from a tensile load of 43 pounds to a compressive load of 43 pounds, then weight D must be of such a magnitude that the load supported by each wire should at least exceed 43 pounds, i. e., the weight D must at least exceed three times 43 pounds or 129 pounds. Of course, it will be apparent to those skilled in the art that any other suitable means of exerting a load corresponding to weight D may also be used. Thus, a thrust bearing pressing against the inner surface of spider 5 at the point of application of the load exerted by weight D and exerting a load on the spider 5 equivalent to the load exerted by weight D could be used. Similarly, the load could be exerted through a lever arrangement, taking into consideration the proportionate lengths of the respective lever arms from the fulcrum.

It can be shown that the three reciprocating movements, represented by A, B, and C, are actually a dynamically balanced force system with the driving mechanism exerting a constant torque. According to the principle of simple harmonic motion, the acceleration of a body is proportional to the distance from the center of oscillation. Let the three points of support on the disk be represented as constantly accelerating toward the center line of rotation O—O' of Fig. 5. The equation of the motion is as follows:

Force = Mass times Acceleration $$= \frac{W(2\pi)^2}{gT^2}(x)$$

where

W = weight of body,
T = period of oscillation, and
x = vertical distance from center line O—O'.

At a given moment, the point of support for body A is at the lower limit of travel and with an upward acceleration proportional to $+x$. Simultaneously, bodies B and C, which are moving 120 degrees out of phase, have downward accelerations proportional to $-x/2$.

Resultant force =

$$(m_A + m_B + m_C)\frac{(2\pi)^2}{T^2}(+x - x/2 - x/2) = 0$$

where $m_A$, $m_B$ and $m_C$ are the respective masses of weights A, B and C. The force component can thus be shown to be zero for any position of the three bodies, hence the support of the disk exerts a constant upward force equal to the combined weight of $A+B+C+D$.

It has thus been shown that the three pulsating forces cancel and in a perfectly balanced system the motor only exerts constant torque sufficient to overcome friction and that a balanced force system is secured. It is to be further noted, since body D has no motion and the three accelerations cancel, that each reciprocating weight may be treated independently as though it supported a non-reciprocating load D/3. Body A may be attached to the test specimen and the other two bodies, B and C, considered as counterweights.

It will be apparent that in the present invention two or more, i. e., a plurality, of reciprocating substantially identical weights may be arranged to form a balanced force system but from a practical viewpoint a balanced force system of three reciprocating forces acting on the levers is preferred as such a system assures the maintenance of an equal distribution of the constant stationary load D to each of the reciprocating weights and each of the wires or filamentary articles. A force system of three, and to some extent two, reciprocating weights acting on the levers tends automatically to maintain itself in balance whereas a system comprising more than three reciprocating weights would not automatically maintain itself in balance. For this reason a force system of three reciprocating weights acting on the levers is preferred and is the most practical. A force system of two reciprocating weights, while not as ideal as one of three reciprocating weights, does appear to be more practical than a system comprising four or more reciprocating weights which would require constant checking to assure even distribution of the steady mean load D. Of course, it will be apparent that by using multiple levers a weight system of more than three reciprocating weights may be reduced to a system of three, or two, reciprocating weights acting on the levers. Thus, a system of six reciprocating weights could be mounted in pairs between three sets of levers which in turn are movably connected at their fulcrums to the two main levers taking the form of disk 4 and spider 5.

In another embodiment of the present invention the three masses A, B and C may be incorporated into a thin disk, shown in Figure 4. Assume this disk to be divided into three segments and suspended by wires from their respective centers of mass. The movements of these segments are essentially simple harmonic motion but with a slight rotational effect about their common center, or the point of support of the body D. Occasion might arise wherein the three reciprocating bodies A, B and C could be advantageously combined into one; e. g., the disk-like body shown in Figure 4.

Another modification of the pulsating-tension machine embodying the fundamental principles of my invention is illustrated in Figures 6, 7, 8, 9 and 10. It is similar to the vertical model described supra except that the reciprocating weights A, B and C of equal mass operate horizontally, are held in alignment by thin flexible steel guides 21 and 22, while the mean load D is applied through a right angle lever 28 and horizontal thrust rod 20 to spider 23 at the central axis of the force system. The horizontal type of machine was constructed because of low cost and ease in operation. However, the vertical type is actually more simple since the reciprocating weights align themselves by gravity, without recourse to flexible guides, while the mean load D is suspended or applied directly and not by means of a right angle lever.

The horizontal fatigue testing machine illustrated in Fig. 6 comprises a bed frame 31 provided with a row of vertical uprights 11, 12, 13, 14 and 15. On one end of the frame there is provided the system of horizontally arranged equal weights or masses A, B and C operatively mounted on a lever or spider. On the other end of said bed frame is mounted a motor M provided with flywheel 18 rigidly mounted on shaft 32 actuated by said motor. Intermediate the two ends of said bed frame are provided mechanical means for attaching wire or other filamentary specimens to the weights, means for operatively mounting the other ends of the wires or other filamentary specimens on a lever or disk, means for applying a constant load to the weights A, B and C, and means operatively engaging flywheel 18 for actuating the weights A, B and C to positively and negatively accelerate said weights in a horizontal direction.

The steel disk 16 acting as a lever with three lever arms, with three holes 120° apart near the periphery, is seated against a ball thrust bearing 33 held by the upright 14 and acting as the fulcrum of the lever. Rigidly attached to this disk is the arm 17 which engages the eccentric ball race 34 in flywheel 18 as illustrated in Fig. 10. Three connecting arms 35, fitted with ball bearing ends 36 seated in the holes of disk 16 equidistant from the fulcrum or seat of bearing 33, extend horizontally to the left and are maintained 120° apart by the flexible guide 19. The left end of these arms are provided with suitable means 37 for gripping or holding wire and other filamentary test specimens, for example suitable thread fittings such as shown in Fig. 9.

The vertical uprights 11 and 12 support, through reamed holes or bores, the horizontal thrust-rod 20 as shown in Fig. 8 for upright 12. On this rod are mounted two flexible steel guides 21 and 22 which in turn support and hold in alignment and 120 degrees apart the reciprocating weights A, B and C. The right ends of these weights via projecting arms 38 are equipped with suitable means 39 for gripping or holding wire or other filamentary article, for example, the gripping means shown in Fig. 9. Arms 40 projecting from these weights to the left are fitted at their ends with stirrups 41 rigidly attached to the arms and equipped with adjustable threaded thrust bearings 42 for adjusting the positioning of spider 23 whose arms extend into stirrup 41 and bear against the thrust bearings 42. The foregoing construction has been found satisfactory in actual practice but in an alternative construction the arms 40 may be provided with ball bearings to seat in the outer surface of the lever or spider 23 shown in Figure 7 in a manner similar to the arrangement shown for the lever or disk 16 and arms 35. In practice the former construction has certain special advantages.

When three wires 24, 25 and 26 are assembled in the machine, the mean stationary weight D exerts a push on the thrust rod 20 via the right-angle lever 28. The thrust rod 20 pushes against its ball bearing seat in spider equalizer 23 at a point equidistant from the arms 40. It can be readily seen that the entire force exerted by mean load D is transmitted through the weights and wires or filamentary specimens and is sustained by the disk 16 which is seated against the bearing 33 in upright 14. The three wire assemblies therefore support equally the mean stationary load D.

The wire specimens 24, 25 and 26 are assembled and the mean load D is raised in position by the hand wheel 27 until the projecting arm of lever 28 is horizontal. The ball race 34 of flywheel 18 is offset slightly by adjustment screws as illustrated in Figure 10 or by other suitable means. If now the flywheel 18 is rotated by means of the motor M the left end of arm 17 will travel in a vertical circle, a movement that will cause disk 16 which is rigidly connected to arm 17 to oscillate about its seat against bearing 33 in upright 14. This movement will cause the three equal weights A, B and C to reciprocate back and forth about the end of the thrust-rod 20 while the weight D remains substantially stationary. As explained supra the movements of these weights are all 120° out of phase; the force resulting from the forward acceleration of one weight is always effectively counterbalanced by the backward accelerations of the other two. It is a feature of the present invention that the force resulting from the acceleration of any one weight at any point in the cycle is always counterbalanced by the forces created by the acceleration of the other reciprocating weights in the system. As a result the motor exerts a constant torque and any desired speed can be obtained without the problems of critical speeds, vibrations, indeterminable forces, etc. Since a pulsating-tensional force is exerted on the wires due to the accelerating of the weights A, B and C, one will eventually break due to fatigue failure. Suitable means can be provided so that mean load D will then descend until it actuates a suitable device, such as striking a trip switch and thus stopping the motor. The actual construction of such a switch or other suitable device is simple and readily understood by those skilled in the art.

In actual operation the wire specimens 25 and 26 are constructed of superior quality of metal and seldom break, while wire test specimen 24, which actuates the reciprocating weight A, is the test specimen from which the test data is obtained. As a result only the travel of weight A needs to be considered; a movement readily determined by the ordinary micrometer microscope. Knowing the speed of the motor or the number of cycles the reciprocating weights pass through in a given time, the weight of the reciprocating weights and the area of the wires, then, by measuring the travel or linear displacement of reciprocating weight A the range of pulsating stress in the test specimen is readily calculated. By varying the eccentricity for any given set of weights, etc., the range of pulsating stress may be varied to obtain data over a varying range of pulsating stresses. Knowing the load exerted by stationary weight D on each wire, it is then possible to calculate the actual maximum and minimum values of the pulsating stress.

The following is an example of the inertial force exerted by a reciprocating weight:

$$F = \pm \frac{W}{32.2} \frac{(2\pi)^2}{T^2} \frac{(x)}{12}$$

$$= \pm \frac{4.5 \times 39.5 \times (0.052/2)}{32.2 \times (1/60)^2 \times 12}$$

$$= \pm 1660 \times 0.052/2$$

$$= \pm 43 \text{ lb.}$$

where

Speed = 3600 R. P. M. = 60 R. P. S.,

W = reciprocating weight = 4.5 pounds = weight A
T = period of oscillation = 1/60 second, and
x = 0.052/2 inch = ½ the linear displacement of the reciprocating weight.

Since there is a mean load D/3 exerted on the wire test specimen, the total range of tension stress is:

$$= [(+100+43) - (+100-43)] \div 0.00113$$
$$= [2 \times 43] \div 0.00113$$
$$= 76,000 \text{ p. s. i.}$$

where d = diameter of test specimen = 0.0379 inch
a = area of test specimen = 0.00113 square inch, and
D = mean load = weight times lever arm ratio (2:1) = 150 pounds times 2 = 300 pounds The tension stress actually pulsates from a minimum of 50,500 p. s. i. to a maximum of 126,500 p. s. i.

It will be noted that in a preferred embodiment of the invention, the apparatus comprises means for operatively connecting a substantially identical mass to each of three wires, at least one of said wires being the wire undergoing test; means for practically harmonically reciprocating said wires and operatively connected masses in about 120° out of phase relation about a central axis of the force system substantially parallel to said wires so that the resultant of the stresses in the wires produced by the acceleration of said masses is substantially zero, and means for imposing a substantially steady equal tensile stress on each of said wires greater than the maximum compressive stress produced in each of said wires by the acceleration of the operatively connected mass during operation of the apparatus.

It is also to be noted that in a preferred embodiment, the present invention provides a method of fatigue testing wires and the like comprising operatively connecting a substantially identical mass to each of three wires, imposing on each of said wires a substantially equal steady tensional stress, reciprocating said wires and masses practically harmonically in about 120° out of phase relation about a central axis of the force system substantially parallel to said wires such that the resultant of the stresses in the wires produced by the acceleration of said masses is substantially zero, said steady tensional stress on each of said wires being greater than the maximum stress produced in the wires by the acceleration of the operatively connected mass.

While the pulsating-tension machine provided by the present invention is particularly advantageous for testing wire and other metallic filamentary articles, it actually has a more general application. By substituting rigid objects or test specimens, for example riveted joints, which will not buckle under compressive loads for the filamentary objects or specimens the entire range of stress reversal can be obtained. For instance, it is possible to subject a material either to pulsating-tension, pulsating-compression, or to tension-compressive forces. By oscillating the lever arrangements, i. e., the spider and disk arrangements, each about a fixed fulcrum or point and eliminating the stationary load the entire range of stress reversal from tension to compression may be obtained. By exerting a steady compressive load on the objects of sufficient magnitude to exceed the variation in stress resulting from accelerating the reciprocating weights, for example by applying a stationary weight at the fulcrum of the top lever arrangement in Fig. 2 and providing an appropriate fulcrum or bearing for both the top and lower lever arrangements, for example by providing a fulcrum or bearing under spider 5 and reversing fulcrum or bearing 8 of disk 4 so that the steady load is evenly distributed as a compressive load to the reciprocating objects and weights, the objects are subjected to pulsating-compression. In that the entire cross-section of the material, not just the outer fibres, are subjected to the variable loadings the invention has a powerful advantage over other fatigue testing methods.

A major difficulty of the prior art was that of gripping the specimens. There was so great a tendency to fail in the end connections that many investigators felt that this problem, added to all the others presented, made pulsating-tension testing impracticable.

I have successfully and satisfactorily solved this problem. A solution to the problem which has been satisfactory in actual practice is illustrated in Figs. 11, 12 and 13.

The ends of the test specimens are first polished to raise the fatigue limit. A threaded sleeve 43, e. g., a ⅜ inch brass sleeve, and a plain sleeve, 44, e. g., a ¼ inch brass sleeve, are then drilled to the diameter of the wire, and are slipped over the ends of the test specimen, preferably to leave about ½ inch of wire protruding. The sleeves are then crimped or pressed under suitable load. A satisfactory method comprises placing the sleeve which has been slipped over the wire into a die such as shown in Fig. 11 and successively pressing each sleeve onto the wire under a load sufficient to close the die. The die openings are designed slightly smaller in diameter than the corresponding sleeve to be pressed or crimped. In addition to pressing both sleeves onto the wire, it is preferred to bend the extended ends to form a loop 45 and to solder the loop. Fig. 12 illustrates one end of a wire over which sleeves have been slipped and a loop formed at the end of the wire. Fig. 13 illustrates one end of the final prepared specimen after the sleeves have been pressed on and the loop soldered. Soldered loop 46 serves to bear against pressed sleeve 44 which in turn bears against pressed sleeve 43. Threading the innermost sleeve has the advantage of utilizing the gripping and frictional resistance against slip provided by the outermost unthreaded sleeve when the specimen is mounted in the fatigue testing machine. Of course, it will be apparent that theoretically a single long sleeve could be used but in actual practice it has been found that drills sufficiently long are not readily available and that considerable difficulty is encountered in drilling a straight bore accurately down the center of the sleeve. This has necessitated the use of a plurality of sleeves substantially in the manner set forth herein. The use of this gripping method has proved extremely effective, as well over 80 percent of the test specimens fail clear of the end connections.

The operation of my fatigue testing machine is remarkably simple. A test wire soldered and pressed into the gripping sleeves as provided supra is assembled in the machine. The other two wires, which, with the test wire, comprise the three phase system, are strong piano wire or the like calculated to outlast the test wire. These wires are necessarily of the same diameter as the test wire to secure a balanced force system. The motor is started, causing the disk to oscillate and thus applying pulsating stresses on the test wire in addition to the constant force exerted by the large stationary center weight. In a preferred embodiment, upon the failure of the specimen under test, the motor immediately stops due to the tripping of the cut out switch or other means referred to hereinabove. Of course, where other sources of rotary motion are employed, other means of interrupting the oscillations of the disk may be provided. Such cut-outs are within the skill of those skilled in the art.

In Fig. 14 curves are illustrated which were drawn from data obtained in accordance with the present invention from the testing of wires having diameters of 0.037 inch with the usual commercial surface conditions. Curve 1 is for new automobile tire bead wire, curve 2 is for bead wire which was never used but was stored for 3½ years, and curve 3 is for bead wire taken from a tire in service for 20,000 miles.

The data obtained showed considerable scattering of points, attributable in part to minute inhomogeneities of the wire tested. Other points, marked with a dash, indicate breaks that showed microscopic imperfections in the fracture. This is explainable by the fact that the wire was uniformly stressed throughout its entire cross-section and over a length of some 15 inches, so that fracture occurred at the weakest point within this length.

Curve 1, representing data obtained on new material, shows a fatigue limit in the neighborhood of 80,000 pounds per square inch. This is a reasonable check, as the value obtained by the stress-reversal method, as applied to this same material, ran about 15 per cent higher. Substantiation of these results is given by R. D. France of the U. S. Bureau of Standards, who reported for a series of 14 different machined steel specimens tested on the Haigh alternating-stress testing machine that "the endurance limit obtained by the axial loading method (pulsating-tension) was in no case greater than that obtained by the rotating beam method."

Curve 2 is drawn from data obtained on wire taken from a spare tire, never serviced but subjected for 3½ years to extremes of climatic temperatures. As expected, the test disclosed no serious falling off in the endurance properties of wire. Static conditions alone do not necessarily lower this value.

Curve 3 is a representation of data on wire taken from a tire which was in service for 20,000 miles and upon which the tread had been worn thin. The trend of the curve is toward a lower endurance value, but this is still somewhat over 60,000 pounds per square inch.

It will be observed that in the present invention an apparatus for fatigue-testing metal wires and other filamentary objects is provided in which the moving or reciprocating weights may be accelerated beyond that of gravity without the wire or other filamentary object buckling. The present invention further provides an apparatus in which the weights reciprocate at successive equal intervals out of phase such that a constant torque is exerted on the motor thus making possible the accurate calibration of the machine and the attainment of any desired speed without encountering so-called critical vibrational effects. An apparatus is provided which comprises a balanced force system thereby avoiding the setting up of indeterminable forces and providing an apparatus in which the frame work merely supports a constant load and does not have to sustain any unbalanced pulsating or periodic forces. In other words, there is no reaction in the frame to such forces.

The present invention provides an apparatus for and method of testing curved wires. Most wires have an initial block curvature due to coiling in processing and cannot be subjected to the usual rotating arc stress reversal fatigue tests. Similarly, wire is frequently curved due to service use. The present invention provides an apparatus and method of subjecting curved wire to fatigue tests to accurately determine the endurance properties or the deterioration in these properties of the curved wire.

It is clear that the present apparatus and method should not be confused with conventional apparatus and methods in use in the fatigue testing art, for example in the rotating-wire arc method in which only the outer fibers are subjected to stress reversals, and that new and extremely valuable results are obtainable by the use of my new apparatus and pulsating stress testing methods. Those skilled in the materials testing art will readily appreciate that, although my machine was developed with reference to a particular problem and a particular current need, viz: the fatigue testing of automobile tire bead wires, it has general value in any study of fatigue phenomena and the various factors involving fatigue failures. Moreover, although the present invention has been described in conjunction with certain specific embodiments thereof, it is to be understood that variations and modifications may be made, as those skilled in the art will readily understand. Such variations and modifications are to be understood to be within the purview and scope of the specification and the appended claims.

I claim:

1. An apparatus for testing the fatigue endurance of objects under pulsating stress comprising two levers, a fulcrum for each lever, means for operatively mounting a plurality of objects in balanced relation between said levers, said objects being similar and at least one of them constituting the specimen to undergo testing, a mass operatively connected to each of said objects, and means for moving one of said levers about its fulcrum whereby an apparatus is provided for fatigue testing objects under pulsating stress which is capable of accurate calibration, the attainment of desired speed without critical vibrational effects, and determining fatigue data for ascertaining fatigue endurance.

2. An apparatus for testing the fatigue endurance of objects under pulsating stress comprising two levers; a fulcrum for each lever; means movably connected to and at positions on each of said levers for operatively mounting a plurality of objects in balanced relation between said levers, said positions being so located at the extremities of radii of a circle concentric with the fulcrum of the lever that said radii form equal central angles; a weight operatively connected to each of said objects, the combined mass of each object and connected weight being equal; means for applying a force on the fulcrums of said levers; and means for moving one of said levers about its fulcrum; whereby an apparatus is provided for fatigue testing objects under pulsating stress which is capable of accurate calibration, the attainment of desired speed without critical vibrational effects, and determining fatigue data for ascertaining fatigue endurance.

3. An apparatus for testing the fatigue endurance of elongated objects under pulsating stress comprising two levers; a fulcrum for each lever; means for operatively mounting three similar elongated objects in balanced relation between said levers, said means being movably connected to each of said levers at positions thereon equidistant from the fulcrum and about 120° apart; a weight operatively connected to each of said objects, each of the weights having equal mass; means for applying a force on the fulcrums of said levers; and means for moving one of said levers about its fulcrum; whereby an apparatus is provided for fatigue testing objects under pulsating stress which is capable of accurate calibration, the attainment of desired speed without critical vibrational effects, and determining fatigue data for ascertaining fatigue endurance.

4. An apparatus for testing the fatigue endurance of filamentary metallic objects under pulsating tensional stress comprising two levers; a fulcrum for each lever; means for operatively mounting three filamentary metallic objects in balanced relation between said levers, said objects being similar and at least one of them constituting the specimen undergoing test, said means being movably connected to each of said levers at positions thereon equidistant from the fulcrum and about 120° apart; a weight operatively connected to each of said objects, each of the weights having equal mass; means for applying a substantially equal steady tensional load on each of said filamentary objects; and means for oscillating one of said levers about its fulcrum; whereby an apparatus is provided for fatigue testing objects under pulsating tensional stress which is capable of accurate calibration, of determining fatigue data for ascertaining fatigue endurance, and the attainment of desired speed without critical vibrational effects and which in operation constitutes a substantially balanced force system.

5. An apparatus for testing the fatigue endurance of wire under pulsating tensional stress comprising three substantially identical masses, means for operatively connecting a substantially identical mass to each of three wires, at least one of said wires undergoing test, means for practically harmonically reciprocating said wires and operatively connected masses in about 120° out of phase relation about a central axis of the force system substantially parallel to said wires so that the resultant of the stresses in the wires produced by the acceleration of said masses is substantially zero, and means other than said masses for imposing a substantially steady equal tensile stress on each of said wires greater than the maximum compressive stress produced in each of said wires by the acceleration of the operatively connected mass during operation of the apparatus.

6. An apparatus for testing the fatigue endurance of wires under pulsating tensional stress comprising two levers; a fulcrum for each lever; means for operatively mounting three wires of substantially the same diameter in balanced relation between said levers, said means being movably connected to each of said levers at positions thereon equidistant from the fulcrum and about 120° apart about said fulcrum; equal masses operatively connected to each of said wires with its center of mass substantially in axial alignment with the wire; means for applying to one of said levers a substantially steady load distributed equally as a tensional load to all of said wires; and means for oscillating one of said levers about its fulcrum; whereby an apparatus is provided for fatigue testing objects under pulsating tensional stress which is capable of accurate calibration, of determining fatigue data for ascertaining fatigue endurance, and the attainment of desired speed without critical vibrational effects and which in operation constitutes a substantially balanced force system.

7. An apparatus for testing the fatigue endurance of wires under pulsating tensional stress comprising two levers; a fulcrum for each lever; means for operatively mounting three wires in balanced relation between said levers, said means being movably connected to each of said levers at positions thereon equidistant from the fulcrum and about 120° apart about said fulcrum; three substantially equal weights, one of said weights being operatively connected to each of said means for mounting wires and with the center of mass of the weight substantially in axial alignment with the wire; means operatively connecting a mean weight to one of said levers and applying its load at the fulcrum of the lever to distribute a substantially equal steady tensional load to said wires, said mean weight being of sufficient magnitude to exert a load on each of said wires in excess of the pulsating force transmitted to each of said wires when the weights operatively connected to each of said means for mounting wires is accelerated in operating said apparatus; and means for oscillating one of said levers about its fulcrum to impart regular periodic positive and negative acceleration to said equal weights; whereby an apparatus is provided for fatigue testing objects under pulsating tensional stress which is capable of accurate calibration, of determining fatigue data for ascertaining fatigue endurance, and of the attainment of desired speed without critical vibrational effects and which in operation constitutes a substantially balanced force system.

8. An apparatus for testing the fatigue endurance of wires under pulsating tensional stress comprising two parallel levers, a fulcrum for each lever, means operatively mounting three wires in balanced relation between said levers, said means being movably connected to each of said levers at positions thereon equidistant from each other and from the fulcrum of the lever, and said wires being mounted between said levers substantially parallel to each other, at least one of said wires constituting the specimen to be tested; three equal weights, one of said weights being operatively connected to each of said wires with its center of mass substantially in axial alignment with the wire; means operatively connecting a mean weight to one of said levers at its fulcrum to distribute a substantially equal steady tensional load to each of said wires, said mean weight exerting a tensional load on each of said wires in excess of the pulsating compressive force transmitted to each of said wires when the weights operatively connected to each of said wires is accelerated in the operation of said apparatus; and means for oscillating one of said levers about its fulcrum to impart practically harmonic motion to said equal weights operatively connected to said wires; whereby an apparatus is provided for fatigue testing objects under pulsating tensional stress which is capable of accurate calibration, of determining fatigue data for ascertaining fatigue endurance of wires, and of the attainment of desired speed without critical vibrational effects and which in operation constitutes a substantially balanced force system.

9. An apparatus for testing fatigue endurance of wires under pulsating tensional stress comprising two levers; six connecting arms, three of said connecting arms being movably connected to each of said levers at positions thereon equidistant from its fulcrum and equidistant from each other, the connecting arms to one lever being alignable with the connecting arms to the other lever; equal masses operatively connected to each aligned pair of connecting arms with the center of mass in alignment with the axis of each aligned pair of connecting arms; gripping means operatively connected to each connecting arm for mounting three wires between said levers in balanced relationship about an axis through the fulcrums; means for applying a substantially equal steady tensional load to each of said wires in excess of the compressive force transmitted to each of said wires by the acceleration of said masses during operation of said apparatus; and actuating means for oscillating one of said levers about its fulcrum to impart practically simple harmonic motion to said equal masses; whereby an apparatus is provided for fatigue testing objects under pulsating tensional stress which is capable of accurate calibration, of determining fatigue data for ascertaining fatigue endurance of wires, and of the attainment of desired speed without critical vibrational effects and which in operation constitutes a substantially balanced force system.

10. An apparatus for testing objects under pulsating stress comprising a force system having two levers movable about spaced fulcrums, means for operatively mounting a plurality of similar objects between said levers and in balanced relation about said spaced fulcrums in said force system, at least one of said objects constituting the specimen to undergo testing, a mass operatively connectible to each of said objects, and means for moving said force system about said fulcrums.

11. An apparatus for testing objects under pulsating stress comprising a first means movable about a fulcrum, a second means movable about a fulcrum, means for mounting a plurality of similar objects in balanced relation between said first and second means, at least one of said objects constituting the specimen to undergo testing, a mass operatively connectible to each of said objects, means for applying a steady load on said objects through one of said fulcrums, and means for moving said first means about its fulcrum.

12. An apparatus for testing wires under pulsating stress comprising a first means movable about a fulcrum, a second means movable about a fulcrum, means for mounting a plurality of similar wires in balanced relation between said first and second means, at least one of said wires constituting the specimen to undergo testing, a mass operatively connectible to each of said wires, means for applying a steady tensile load on said wires through one of said fulcrums, and means for moving said first means about its fulcrum.

13. A method of testing an elongated object under pulsating stress comprising operatively connecting a mass to each of a plurality of similar objects mounted in a balanced force system having two levers movable about spaced fulcrums, applying a steady load on said force system at one of said fulcrums, reciprocating said force system about said fulcrums practically harmonically to accelerate the masses in out of phase relationship such that the resultant of the stresses produced by the acceleration of said masses and objects is substantially zero.

14. A method of testing a wire under pulsating stress comprising operatively connecting a mass to each of a plurality of similar wires mounted in a balanced force system having two levers movable about spaced fulcrums, applying a steady tensile load on said force system at one of said fulcrums, reciprocating said force system about said fulcrums practically harmonically to accelerate the masses in out of phase relationship such that the resultant of the stresses produced by the acceleration of said masses and wires is substantially zero.

15. A method of testing an elongated object under pulsating stress comprising operatively connecting a mass to the elongated object, subjecting said object and mass to regular periodic positive and negative acceleration parallel to the longitudinal axis of said object to impose a varying load on said object due to the acceleration of said mass, and simultaneously imposing on said object a substantially unvarying load in addition to any loads applied by any accelerating mass connected to said object.

16. A method of testing wire under pulsating tensional stress comprising connecting a substantially similar mass to each of a plurality of wires including the wire to be tested, reciprocating said wires and masses practically harmonically and in successively substantially equal out-of-phase relation to impose similar varying loads on each of said wires due to the acceleration of said masses, and simultaneously imposing on said reciprocating wires substantially equal and unvarying tensional loads in addition to any loads applied by any reciprocating masses connected to said wires.

17. A method of fatigue testing a wire under pulsating tensional stress comprising operatively connecting equivalent masses to a plurality of wires, including the wire to be tested, reciprocating said wires and masses practically harmonically and in successively substantially equal out-of-phase relation parallel to the longitudinal axes of said wires and about a central axis of the force system to impose similar varying loads on each of said wires due to the acceleration of said masses, and simultaneously imposing on each of said reciprocating wires a substantially equal and unvarying tensional stress in addition to any stress applied by any reciprocating masses connected to said wires, said unvarying stress on each of said wires being greater than the maximum stress produced in the wires by the acceleration of the operatively connected mass.

18. A method of testing an object under pulsating stress comprising operatively connecting a substantially similar mass to each of a plurality of objects including the object to be tested, reciprocating said wires and masses to subject the same to regular periodic positive and negative acceleration in successively substantially equal out-of-phase relation and to impose similar varying loads on each of said objects due to the acceleration of said masses, and simultaneously imposing on said reciprocating objects substantially equal and unvarying loads in addition to loads applied by any reciprocating masses connected to said wires.

19. A method of fatigue testing a wire under pulsating tensional stress comprising operatively connecting a substantially identical mass to each of three wires including the wire to be tested, reciprocating said wires and masses practically harmonically in about 120° out-of-phase relation parallel to the longitudinal axes of said wires and about a central axis substantially parallel to said wires to impose similar varying loads on each of said wires due to the acceleration of said masses, and simultaneously imposing on each of said reciprocating wires a substantially equal and unvarying tensional stress in addition to any stress applied by any reciprocating masses connected to said wires, said unvarying stress on each of said wires being greater than the maximum stress produced in the wires by the acceleration of the operatively connected mass.

20. An apparatus for testing the fatigue endurance of wire under pulsating tensional stress comprising a plurality of substantially identical masses, means for operatively connecting one of said substantially identical masses to each of a plurality of wires, at least one of said wires undergoing test, means for practically harmonically reciprocating said wires and operatively connected masses in successively substantially equal out-of-phase relation about a central axis of the force system substantially parallel to said wires so that the resultant of the stresses in the wires produced by the acceleration of said masses is substantially zero, and means other than said masses for imposing a substantially steady equal tensile stress on each of said wires greater than the maximum compressive stress produced in each of said wires by the acceleration of the operatively connected mass during operation of the apparatus.

21. An apparatus for testing objects under pulsating stress comprising a plurality of substantially identical masses, means for operatively connecting one of said substantially identical masses to each of a plurality of objects, at least one of said objects undergoing test, means for practically harmonically reciprocating said objects and operatively connected masses in successively substantially equal out-of-phase relation about a central axis of the force system substantially parallel to said objects so that the resultant of the stresses in the objects produced by the acceleration of said masses is substantially zero, and means other than said masses for imposing a substantially steady equal stress on each of said objects greater than the stress produced in said objects by the acceleration of the operatively connected mass during operation of the apparatus.

JOHN N. KENYON.